United States Patent [19]

Nakata et al.

[11] Patent Number: 4,997,866
[45] Date of Patent: Mar. 5, 1991

[54] POLYARYLENE SULFIDE RESIN COMPOSITION IMPROVED IN PAINTABILITY

[75] Inventors: Akira Nakata; Naoki Yamamoto; Hiroshi Mori, all of Otake; Takuya Ueno, Kobe, all of Japan

[73] Assignee: Mitsubishi Rayon Co., Ltd., Tokyo, Japan

[21] Appl. No.: 480,834

[22] Filed: Feb. 16, 1990

[30] Foreign Application Priority Data

Feb. 17, 1989 [JP] Japan ................................ 1-037737

[51] Int. Cl.⁵ .............................................. C08G 63/91
[52] U.S. Cl. .................................... 523/512; 523/523; 523/526; 523/527; 524/513; 524/539; 525/36; 525/37; 525/38; 525/39; 525/40; 525/41; 525/43; 525/44; 525/46; 525/47; 525/48; 525/49; 525/189; 525/445; 525/444; 525/537
[58] Field of Search ............... 523/512, 523, 526, 527; 524/539; 525/437, 537, 445, 36–40

[56] References Cited

U.S. PATENT DOCUMENTS

| 4,251,429 | 2/1981 | Salee | 524/539 |
| 4,528,346 | 7/1985 | Sugie et al. | 525/537 |
| 4,849,489 | 7/1989 | Crosby et al. | 524/439 |

FOREIGN PATENT DOCUMENTS

| 286257 | 10/1988 | European Pat. Off. . |
| 315478 | 5/1989 | European Pat. Off. . |
| 315480 | 5/1989 | European Pat. Off. . |
| 57-168945 | 10/1982 | Japan . |
| 59-64655 | 4/1984 | Japan . |
| 59-64657 | 4/1984 | Japan . |
| 62-218436 | 9/1987 | Japan . |
| 62-218441 | 9/1987 | Japan . |
| 205358 | 8/1988 | Japan . |

Primary Examiner—John C. Bleutge
Assistant Examiner—David W. Woodward
Attorney, Agent, or Firm—Cushman, Darby & Cushman

[57] ABSTRACT

A polyarylene sulfide resin composition comprising a resin composition obtainable by polymerizing 40 to 0.1 part by weight of an unsaturated polyester and 0.01 to 30 parts by weight of a monomer having one or more ethylenic unsaturated bonds in the presence of 100 parts by weight of a composition comprising 1 to 99 wt. % of a polyarylene sulfide resin and 99 to 1 wt. % of a thermoplastic polyester. Since the polyarylene sulfide resin composition of the present invention is in a state wherein the polyarylene sulfide resin and thermoplastic polyester are uniformly mixed, the constituent components are uniformly dispersed and mixed to such a degree that the composition shows no phase separation even if it is passed through molding processes such as extrusion molding, injection molding, etc. carried out under normal conditions. Consequently, the composition of the present invention is very superior in that the adhesive property of paint film (paintability), which the conventional polyarylene sulfide resins do not have well, has been improved without a large reduction in the excellent properties of the polyarylene sulfide resin.

12 Claims, No Drawings

POLYARYLENE SULFIDE RESIN COMPOSITION IMPROVED IN PAINTABILITY

The present invention relates to a polyarylene sulfide resin composition.

Demand for the polyarylene sulfide resin has recently increased as engineering plastics excellent in heat resistance, solvent resistance, hydrolysis resistance, flame retardancy and mechanical properties.

However, the polyarylene sulfide resin is poor in paintability. In other words, when a paint is applied to the surface of molded products produced from the resin and then cured, the adhesive property of the paint film is so poor that there has been a problem of this resin being difficult to use as a material for exterior use.

Since a thermoplastic polyester is superior in the paintability to the polyarylene sulfide resin, it has been tried to blend them. However, compatibility between them is insufficient, so that there is a problem that the molded product becomes poor in the mechanical properties and surface state.

In view of such a situation, the present inventors have eagerly studied a polyarylene sulfide resin composition which have been improved in paintability without a large reduction in the heat resistance, mechanical strength, etc. inherent to the polyarylene sulfide resin. The present inventors thus attained to the present invention.

The present invention relates to a polyarylene sulfide resin composition comprising a resin composition obtainable by polymerizing 40 to 0.1 part by weight of an unsaturated polyester and 0.01 to 30 parts by weight of a monomer having one or more ethylenic unsaturated bonds in the presence of 100 parts by weight of a composition comprising 1 to 99 wt. % of a polyarylene sulfide resin and 99 to 1 wt. % of a thermoplastic polyester.

An object of the present invention is to provide a polyarylene sulfide resin composition having excellent paintability.

Other objects and advantages will become apparent from the following description.

The polyarylene sulfide resin used in the present invention is a polymer having as a main constituent unit a repeating unit represented by the formula,

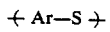

wherein Ar represents

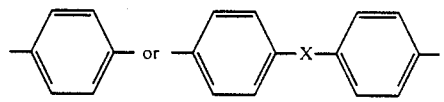

(in which X represents —SO$_2$—, —CO—, —O— or an alkylene group of which the main chain has 5 or less carbon atoms and may have 0–2 methyl side chains bonded thereto), or the above aromatic ring having 1 to 3 halogen atoms or methyl groups as a substituent(s), or a mixture thereof. Among these polyarylene sulfide resins, polyphenylene sulfide is more preferably used.

The thermoplastic polyester used in the present invention is not particularly limited. It includes polyesters obtained from a dicarboxylic acid, its anhydride or its ester and a glycol. The dicarboxylic acid and its anhydride include terephthalic acid, isophthalic acid, phthalic acid, phthalic acid anhydride, 4,4'-diphenyldicarboxylic acid, diphenyletherdicarboxylic acid, α,β-bis(4-carboxyphenoxy)ethane, adipic acid, sebacic acid, azelaic acid, decanedicarboxylic acid, dodecanedicarboxylic acid, cyclohexanedicarboxylic acid, etc. The glycol includes ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxyphenyl)propane, xylylene glycol, polyethylene ether glycol, polytetramethylene ether glycol, aliphatic polyester oligomers having a hydroxyl group at the both terminals.

In producing the thermoplastic polyester, the following comonomers may be used as an additional component: Hydroxycarboxylic acids such as glycolic acid, hydroxybutyric acid, hydroxybenzoic acid, hydroxyphenylacetic acid, naphthylglycolic acid, and lactone compounds such as propiolactone, butyrolactone, valerolactone, caprolactone, etc.

Similarly, the following polyfunctional ester-forming comonomers may be used so far as the thermoplastic property can be maintained: Trimethylolpropane, trimethylolethane, glycerin, pentaerythritol, trimellitic acid, trimesic acid, pyromellitic acid, etc. Further similarly, the following ester-forming comonomers having a halogen atom (e.g. chlorine, bromine) at the aromatic ring may be used: Dibromoterephthalic acid, tetrabromoterephthalic acid, tetrabromophthalic acid, dichloroterephthalic acid, tetrachloroterephthalic acid, 1,4-dimethyloltetrabromobenzene, tetrabromobisphenol A, adducts of tetrabromobisphenol A and ethylene oxide, etc.

Among these thermoplastic polyesters, preferred ones are those in which the intrinsic viscosity (η) in a mixed solvent of phenol and tetrachloroethane in a weight ratio of 6:4 is 0.3 to 1.5 dl/g at 30° C.

Specifically, a preferred thermoplastic polyester is polyethylene terephthalate, polybutylene terephthalate, polycyclohexane dimethylene terephthalate, etc.

In the present invention, the polyarylene sulfide resin and thermoplastic polyester are blended in a weight ratio of 99:1 to 1:99.

The unsaturated polyester used in the present invention means a polyester having an ethylenic unsaturated bond, and it is obtained by the condensation of a dibasic acid having ethylenic unsaturated bond, an unsaturated dibasic acid and a dihydric alcohol.

The dibasic acid having no ethylenic unsaturated bond used here includes dicarboxylic acids, their anhydrides and their halogenated derivatives such as terephthalic acid, isophthalic acid, phthalic acid, phthalic acid anhydride, naphthalenedicarboxylic acid, 4,4'-diphenyldicarboxylic acid, diphenyletherdicarboxylic acid, α,β-bis(4-carboxyphendxy)ethane, adipic acid, sebacic acid, azelaic acid, decanedicarboxylic acid, dodecanedicarboxylic acid, cyclohexanedicarboxylic acid, endic acid, chlorendic acid, tetrabromophthalic acid, etc.

The unsaturated dibasic acid includes dicarboxylic acids having one or more ethylenic unsaturated double bonds in the molecule such as maleic acid anhydride, fumaric acid, tetrahydrophthalic acid, itaconic acid, etc.

The dihydric alcohol includes ethylene glycol, propylene glycol, butanediol, diethylene glycol, trimethylene glycol, trimethylpentanediol, trimethylolpropane monoallyl ether, hydrogenated bisphenols, bisphenol dioxypropyl ether, pentanediol, neopentyl glycol, hexanediol, octanediol, decanediol, cyclohexanedimethanol, hydroquinone, bisphenol A, 2,2-bis(4-hydroxyethoxyphenyl)propane, xylylene glycol, polyethylene ether glycol, polytetramethylene ether glycol, aliphatic and aromatic polyester oligomers having a hydroxyl group at the both terminals, etc.

In producing the unsaturated polyester used in the present invention, the following comonomers may be used as an additional component in addition to the foregoing components: Hydroxycarboxylic acids such as glycolic acid, hydroxybutyric acid, hydroxybenzoic acid, hydroxyphenylacetic acid, naphthylglycolic acid, etc.; and lactone compounds such as propiolactone, butyrolactone, valerolactone, caprolactone, etc. Similarly, the following polyfunctional ester-forming comonomers may be used so far as they do not injure homogeneous compatibility of a polyarylene sulfide resin, thermoplastic polyester and unsaturated polyester with one another: Trimethylolpropane, trimethylolethane, glycerin, pentaerythritol, trimellitic acid, trimesic acid, pyromellitic acid, etc. A preferred unsaturated polyester used in the present invention is one obtained by co-condensation of maleic acid anhydride, phthalic acid anhydride, propylene glycol and ethylene glycol.

In the present invention, as the monomer which polymerizes in the presence of the polyarylene sulfide resin, thermoplastic polyester and unsaturated polyester, any of those having one or more polyemrizable ethylenic unsaturated bonds may be used. As examples of such a monomer, there may be mentioned aromatic alkenyl compounds such as styrene, α-methylstyrene, vinylstyrene, vinyltoluene, vinylnaphthalene, vinylanthracene, etc.; (meth)acrylates such as methyl (meth)acrylate, ethyl (meth)acrylate, butyl (meth)acrylate, 2-ethylhexyl (meth)acrylate, lauryl (meth)acrylate, dodecyl (meth)acrylate, stearyl (meth)acrylate, 2-hydroxyethyl (meth)acrylate, 2-hydroxypropyl (meth)acrylate, cyclohexyl (meth)acrylate, glycidyl (meth)acrylate, dimethylaminoethyl methacrylate, diethylaminoethyl (meth)acrylate, tetrahydrofurfuryl (meth)acrylate, etc.; N-substituted or non-substituted maleimides such as maleimide, N-methylmaleimide, N-phenylmaleimide, N-ethylmaleimide, N-cyclohexylmaleimide, etc.; (meth)acrylamides such as (meth)acrylamide, N-methyl(meth)acrylamide, N,N-dimethyl(meth)acrylamide, etc.; unsaturated acids or unsaturated acid anhdyrides such as (meth)acrylic acid, maleic acid, itaconic acid, maleic acid anhydride, itaconic acid anhydride, etc.; vinyl cyanides such as (meth)acrylonitrile, etc.; vinyl ether compounds such as vinyl ethyl ether, etc.; and compounds having a plural number of ethylenic unsaturated bonds such as allyl methacryalte, triallyl cyanulate, diallyl phthalate, ethylene glycol dimethacrylate, 1,3-butylene glycol dimethacrylate, trimethylolpropane trimethacrylate, etc. In terms of polymerizability and the paintability of a molded polymer obtained by the polymerization, styrene, α-methylstyrene, methyl (meth)acrylate, ethyl (meth)acrylate, 2-ethylhexyl (meth)acrylate, 2-hydroxyethyl (meth)acrylate, glycidyl (meth)acrylate, N-methylmaleimide, N-phenylmaleimide, (meth)acrylamide, (meth)acrylic acid, maleic acid anhydride and (meth)acrylonitrile are preferred. More preferably, the aromatic alkenyl compounds are used, and among them, styrene is particularly preferred. These monomers are used alone or in combination.

The unsaturated polyester used in the present invention is added in an amount of 0.1 to 40 parts by weight based on 100 parts by weight of the total weight of the polyarylene sulfide resin and thermoplastic polyester.

The monomer is added in an amount of 0.01 to 30 parts by weight based on 100 parts by weight of the total weight of the polyarylene sulfide resin and thermoplastic polyester.

When an amount of the unsaturated polyester is less than 0.1 part by weight or an amount of the monomer is less than 0.01 part by weight, compatibility between the polyarylene sulfide resin and thermoplastic polyester becomes insufficient, so that molded products produced from the composition obtained do not have satisfactory mechanical characteristics and surface appearance. When the total weight of the unsaturated polyester and monomer exceeds 70 parts by weight based on 100 parts by weight of the total weight of the polyarylene sulfide resin and thermopalstic polyester, the flowability at the time of molding lowers.

In the present invention, it is desirable that a weight ratio of the unsaturated polyester to the monomer is 80:20 to 20:80, and besides that the total weight of the unsaturated polyester and monomer is 5 to 50 parts by weight based on 100 parts by weight of the total weight of the polyarylene sulfide resin and thermoplastic polyester.

The polyarylene sulfide resin composition of the present invention may contain a filler as an additional component.

The filler may have any form of fibrous forms, powdery forms, granular forms and others. Examples of the filler include glass fibers, carbon fibers, potassium titanate, asbestos, silicon carbide, ceramics fibers, metal fibers, silicon nitride, aramide fibers, barium sulfate, calcium sulfate, calcium silicate, calcium carbonate, magnesium carbonate, dolomite, antimony trioxide, zinc oxide, titanium oxide, magnesium oxide, iron oxide, molybdenum disulfide, mica, talc, kaolin, pyrophyllite, bentonite, sericite, zeolite, attapulgite, wollastonite, other clays, ferrite, graphite, gypsum, glass beads, quartz, etc. When these fillers are used, their amount is preferably 300 parts by weight or less, preferably 10–300 parts by weight based on 100 parts by weight of the total weight of the polyarylene sulfide resin, thermoplastic polyester, unsaturated polyester and monomer having one or more ethylenic unsaturated bonds. When the amount exceeds 300 parts by weight, the melt-flowability of the composition becomes poor, and therefore the appearance of the molded product undesirably tends to be injured.

In the polyarylene sulfide resin composition of the present invention, it is desirable that the polyarylene sulfide resin, thermoplastic polyester, unsaturated polyester, a polymer produced by polymerization of the foregoing monomer and if necessary, the filler are in a substantially uniformly mixed and dispersed state. Further, a part of the above polymer may be grafted to the polyarylene sulfide resin.

Into the polyarylene sulfide resin composition of the present invention may be incorporated, if necessary, a mold-release agent, coloring agent, heat stabilizer, ultraviolet light absorber, foaming agent, rust preventive, flame retardant, flame retarding assistant, etc., so far as the characteristics of the present composition are not much injured.

The polarylene sulfide resin composition of the present invention can be obtained by the polymerization method in which the unsaturated polyester and the monomer are polymerized in a state wherein the unsaturated polyester, the monomer and a radical polymerization initiator are mixed in the presence of polyarylene sulfide resin and thermoplastic polyester, or by the bulk polymerization method in which the unsaturated polyester and the monomer are polymerized in a state wherein the polyarylene sulfide resin, the thermoplastic polyester, the unsaturated polyester, the monomer and a radical polymerization initiator, etc. are mixed and thereafter kneaded in a state that the polyarylene sulfide and thermoplastic polyester are in a molten state, or by the solution polymerization or suspension polymerization method in which the monomer and the unsaturated polyester are polymerized in a state wherein the polyarylene sulfide resin, the thermoplastic polyester, the unsaturated polyester and the monomer are mixed. However, it is preferred to carry out the above mentioned bulk polyemrization method.

When the filler is incorporated in this composition, it may be allowed to coexist at the time of polymerization of the monomer, or it may be added after the polymerization.

When the monomer is polymerized in a state wherein it is mixed or kneaded with the polyarylene sulfide resin, there may be used any of radical polymerization initiators which can polymerize the monomer in this mixed or kneaded state. Since, however, the polyarylene sulfide resin has a melting temperature as high as 290° C. or more, a radical polymerization initiator having a half-life period of 1 minute or more at 100° C. is preferred as an initiator used in polymerizing the monomer in a molten state of the resin. Such an initiator includes benzoyl peroxide, p-chlorobenzoyl peroxide, 2,4-dichlorobenzoyl peroxide, acetyl peroxide, methyl ethyl ketone peroxide, dicumyl peroxide, tert-butyl perbenzoate, etc. When the polymerization is carried out in a melt-mixed state or kneaded state of the polyarylene sulfide resin and other components, an amount of the initiator is preferably 0.01 to 20 parts by weight based on 100 parts by weight of the total weight of the monomer having one or more ethylenic unsaturated bonds, the unsaturated polyester, the polyarylene sulfide resin and the thermoplastic polyester.

When the polymerization of the monomer is carried out in a melt-mixed state or kneaded state of the polyarylene sulfide resin and other components, it is preferred to carry out the polymerization in the inside of an extruder. In other words, it is preferred to carry out the polymerization while passing a mixture of the polyarylene sulfide resin, the thermoplastic polyester, the monomer, the unsaturated polyester, the radical polymerization initiator and if necessary the filler and other additives through an extruder under common extrusion conditions for the polyarylene sulfide resin or under conditions similar thereto.

The polyarylene sulfide resin composition thus obtained, as compared with a composition in which the constituent polymers are simply blended even if the composition of the polyarylene sulfide resin and thermoplastic polyester is the same as that of the above composition, is superior in the compatibility between the polyarylene sulfide resin and thermoplastic polyester, and also since these constituent polymers are in a uniformly mixed state, the composition shows no phase separation even if it is passed through molding processes such as extrusion molding, injection molding, etc. carried out under normal conditions. Further, the amounts of these polymers added to the polyarylene sulfide resin are so proper that the composition is excellent in the adhesive property of paint film (paintability) without a large reduction in the excellent properties of the polyarylene sulfide resin.

The present invention is illustrated in more detail with reference to the following examples. However, the present invention should not be construed to be restricted by these examples.

In the examples and comparative examples, the adhesive property of paint film was measured as follows: A paint is applied to the surface of a flat molded product and dried; 11 parallel grooves are cut into the paint film at intervals of 1 mm in one direction, and the same procedure is repeated in the direction perpendicular thereto, thereby forming 100 1 $\overline{mm^2}$ grid patterns; and adhesive tape is applied over the crosshatched area and peeled off the area in the vertical direction to the surface of the flat molded product; and the number of the paint films peeled off the area is counted. The adhesive property of paint film is evaluated according to the following standard:

The number of peeled paint films
Excellent [⊚]: 10 or less
Good [O]: 11 to 20
Not good [Δ]: 21 to 40
Bad [X]: 41 or more The appearance of the flat molded product is visually inspected and evaluated according to the following standard:

Good [O]: The surface is uniform and pearly luster is not observed over the whole surface.
Not good [Δ]: Pearly luster is observed only in the vicinity of the gate.
Bad [X]: Pearly luster is remarkable.

The heat distortion temperature (HDT) was measured according to ASTM D 256 (with a load of 4.6 kg).

EXAMPLE 1

70 Parts by weight of a powdery polyphenylene sulfide resin (Tohpren T-4 produced by Tohpren Co., Ltd ; average particle size, 50 μm), 30 parts by weight of a polyester composed of cyclohexanedimethanol and terephtalic acid (polycyclohexanedimethylene terephthalate (hereinafter referred to as PCT); [η]=0.9), which is a thermopalstic polyester, 12 parts by weight of an unsaturated polyester obtained from ethylene glycol and maleic acid anhydride ([η]=0.2), 6 parts by weight of styrene and 1 part by weight of benzoyl peroxide were mixed. The mixture was extruded through a twin-screw extruder (Werner Pfleiderer 30 Φ) at a barrel temperature of 30° C. and pelletized on a pelletizer.

The resulting pellets were molded into a flat plate of 100×100×3 mm in size on an injection molding machine (IS-100 produced by Toshiba Machine Co., Ltd.) under a condition that the cylinder temperature was 310° C. and the mold temperature was 140° C. The appearance of the plate was observed. The surface thereof was defatted by wiping it with methanol, and coated with an epoxy resin paint (Epona 2000 produced by Origin Denki Co.) under normal conditions. The peeling test was carried out. The results are shown in Table 1.

EXAMPLES 2 to 17

Procedure was carried out in the same manner as in Example 1 except that the same polyphenylene sulfide resin and unsaturated polyester as used in Example 1, and the thermopalstic polyesters, monomers and initiators shown in Table 1 were used in proportions shown in Table 1. The results are shown in Table 1.

TABLE 1

| Example | PPS (parts by weight) | Thermoplastic polyester (parts by weight) | | | Unsaturated polyester (parts by weight) | Monomer (parts by weight) | | | Polymerization initiator (part by weight) | | Adhesive property of paint film | Appearance |
|---|---|---|---|---|---|---|---|---|---|---|---|---|
| | | PCT | PET | PBT | | St | AN | MMA | BPO | CPO | | |
| 1 | 70 | 30 | | | 12 | 6 | — | — | 1 | — | ◉ | ○ |
| 2 | 50 | 50 | | | 12 | 6 | — | — | 1 | — | ○ | ○ |
| 3 | 30 | 70 | | | 12 | 6 | — | — | 1 | — | ○ | ○ |
| 4 | 70 | 30 | | | 12 | 6 | — | — | — | 1 | ◉ | ○ |
| 5 | 70 | 30 | | | 3 | 2 | — | — | 0.25 | — | ○ | ○ |
| 6 | 70 | 30 | | | 21 | 14 | — | — | 1 | — | ◉ | ○ |
| 7 | 70 | 30 | | | 3 | 17 | — | — | 0.5 | — | ○ | ○ |
| 8 | 70 | 30 | | | 17 | 3 | — | — | 0.5 | — | ◉ | ○ |
| 9 | 70 | 30 | | | 12 | 3 | — | 3 | 1 | — | ◉ | ○ |
| 10 | 70 | 30 | | | 12 | 5 | 2 | — | 1 | — | ◉ | ○ |
| 11 | 70 | 30 | | | 12 | — | — | 6 | 1 | — | ◉ | ○ |
| 12 | 70 | | 30 | | 12 | 6 | — | — | 1 | — | ○ | ○ |
| 13 | 50 | | 50 | | 12 | 6 | — | — | 1 | — | ○ | ○ |
| 14 | 30 | | 70 | | 12 | 6 | — | — | 1 | — | ○ | ○ |
| 15 | 70 | | | 30 | 12 | 6 | — | — | 1 | — | ○ | ○ |
| 16 | 50 | | | 50 | 12 | 6 | — | — | 1 | — | ○ | ○ |
| 17 | 30 | | | 70 | 12 | 6 | — | — | 1 | — | ○ | ○ |

Note:
PET: Polyethylene terephthalate
PBT: Polybutylene terephthalate
St: Styrene
AN: Acrylonitrile
MMA: Methyl methacrylate
BPO: Benzoyl peroxide
CPO: Dicumyl peroxide

COMPARATIVE EXAMPLES 1 to 9

For the purpose of comparison, procedure was carried out in the same manner as in Example 1 except that an unsaturated polyester and monomer were not used, but only the polyphenylene sulfide resin and thermoplastic polyesters shown in Table 2 were used. The results are shown in Table 2.

TABLE 2

| Comparative Example | PPS (parts by weight) | Thermoplastic polyester (parts by weight) | | | Adhesive property of paint film | Appearance |
|---|---|---|---|---|---|---|
| | | PCT | PET | PBT | | |
| 1 | 70 | 30 | | | X | X |
| 2 | 50 | 50 | | | X | X |
| 3 | 30 | 70 | | | X | X |
| 4 | 70 | | 30 | | X | X |
| 5 | 50 | | 50 | | X | X |
| 6 | 30 | | 70 | | X | X |
| 7 | 70 | | | 30 | X | X |
| 8 | 50 | | | 50 | X | X |
| 9 | 30 | | | 70 | X | X |

EXAMPLES 18 to 23

Flat molded products were prepared in the same manner as in Example 1 except that the same polyphenylene sulfide resin and unsaturated polyester as used in Example 1, and the thermoplastic polyesters, monomers, fillers and benzoyl peroxide shown in Table 3 were used in proportions shown in Table 3. The adhesive property of paint film was evaluated, and further flexural strength, flexural modulus and heat distortion temperature were measured. The results are shown in Table 3.

COMPARATIVE EXAMPLES 10 to 15

Procedure was carried out in the same manner as in Example 18 except that an unsaturated polyester and monomer were not used, but only the polyphenylene sulfide resin and fillers or fillers and thermoplastic polyesters shown in Table 4 were used. The results are shown in Table 4.

TABLE 3

| Example | PPS (parts by weight) | Thermoplastic polyester (parts by weight) | | | Filler (parts by weight) | | | Unsaturated polyester (parts by weight) | Monomer (parts by weight) | | BPO (part by weight) | Flexural strength (kg/cm²) | Flexural modulus (kg/cm²) | HDT (°C.) | Adhesive property of paint film |
|---|---|---|---|---|---|---|---|---|---|---|---|---|---|---|---|
| | | PCT | PET | PBT | GF | CF | Talc | | St | MMA | | | | | |
| 18 | 70 | 30 | | | 66 | | | 12 | 6 | — | 1 | 2250 | 120000 | 266 | ◉ |
| 19 | 70 | 30 | | | | 43 | | 12 | 6 | — | 1 | 2100 | 185000 | 266 | ◉ |
| 20 | 70 | 30 | | | | | 33 | 12 | 6 | — | 1 | 1150 | 45000 | 231 | ○ |
| 21 | 70 | | 30 | | 66 | | | 12 | 6 | — | 1 | 2100 | 118000 | 240 | ◉ |
| 22 | 70 | | | 30 | 66 | | | 12 | 6 | — | 1 | 2100 | 118000 | 236 | ○ |

TABLE 3-continued

| Example | PPS (parts by weight) | Thermoplastic polyester (parts by weight) | | | Filler (parts by weight) | | | Unsaturated polyester (parts by weight) | Monomer (parts by weight) | | BPO (part by weight) | Flexural strength (kg/cm$^2$) | Flexural modulus (kg/cm$^2$) | HDT (°C.) | Adhesive property of paint film |
|---|---|---|---|---|---|---|---|---|---|---|---|---|---|---|---|
| | | PCT | PET | PBT | GF | CF | Talc | | St | MMA | | | | | |
| 23 | 70 | 30 | | | 66 | | | 12 | — | 6 | 1 | 2250 | 125000 | 265 | ⊚ |

Note:
GF: Glass fiber
CF: Carbon fiber

TABLE 4

| Comparative Example | PPS (parts by weight) | Thermoplastic polyester (parts by weight) | | | Filler (parts by weight) | | | Flexural strength (kg/cm$^2$) | Flexural modulus (kg/cm$^2$) | HDT (°C.) | Adhesive property of paint film |
|---|---|---|---|---|---|---|---|---|---|---|---|
| | | PCT | PET | PBT | GF | CF | Talc | | | | |
| 10 | 100 | | | | 66 | | | 2600 | 142000 | 268 | X |
| 11 | 100 | | | | | 43 | | 2200 | 217000 | 265 | X |
| 12 | 100 | | | | | | 33 | 1400 | 58000 | 242 | X |
| 13 | 70 | 30 | | | 66 | | | 2500 | 120000 | 258 | X |
| 14 | 70 | | 30 | | 66 | | | 2500 | 115000 | 247 | X |
| 15 | 70 | | | 30 | 66 | | | 2500 | 115000 | 245 | X |

EXAMPLES 24 and 25

Pelletizing, injection molding and evaluation were carried out in the same manner as in Examples 1 and 18 except that the polyphenylene sulfide resin was changed to a straight chain-type one (M-2588 produced by Toray Phillips Co., Ltd.). The results are shown in Tables 5 and 6.

TABLE 5

| Example | Adhesive property of paint film | Appearance |
|---|---|---|
| 24 | ⊚ | ○ |

TABLE 6

| Example | Flexural strength (kg/cm$^2$) | Flexural modulus (kg/cm$^2$) | HDT (°C.) | Adhesive property of paint film |
|---|---|---|---|---|
| 25 | 2300 | 120000 | 265 | ⊚ |

What is claimed is:

1. A polyarylene sulfide resin composition comprising a resin composition obtained by polymerizing
    0.01 to 30 parts by weight of a monomer having one or more ethylenic unsaturated bonds in the presence of
    0.1 to 40 parts by weight of an unsaturated polyester obtained by condensation polymerization of a dibasic acid having no ethylenic unsaturated bond, an unsaturated dibasic acid and a dihydric alcohol, and
    100 parts by weight of a composition consisting of 1 to 99 wt. % of a polyarylene sulfide resin and 99 to 1 wt. % of a thermoplastic polyester having no ethylenic unsaturated bond.

2. A polyarylene sulfide resin composition according to claim 1, wherein the polyarylene sulfide resin is polyphenylene sulfide.

3. A polyarylene sulfide resin composition according to claim 1, wherein the weight ratio of the unsaturated polyester to the monomer having one or more ethylenic unsaturated bonds is 80:20 to 20:80.

4. A polyarylene sulfide resin composition according to claim 1, wherein the total weight of the unsaturated polyester and the monomer having one or more ethylenic unsaturated bonds is 5 to 40 parts by weight based on 100 parts by weight of the total weight of the polyarylene sulfide resin and thermoplastic polyester.

5. A polyarylene sulfide resin composition according to claim 1, wherein the monomer having one or more ethylenic unsaturated bonds is an aromatic alkenyl compound.

6. A polyarylene sulfide resin composition according to claim 1, wherein the polymerization of the monomer having one or more ethylenic unsaturated bonds is carried out in a condition such that the polyarylene sulfide resin, thermoplastic polyester having no ethylenic unsaturated bond and unsaturated polyester are in a molten state.

7. A polyarylene sulfide resin composition according to claim 1, wherein the polymerization of the monomer having one or more ethylenic unsaturated bonds is carried out in admixture with a filler in a condition such that the polyarylene sulfide resin, thermoplastic polyester having no ethylenic unsaturated bond and unsaturated polyester are in a molten state.

8. A polyarylene sulfide resin composition according to claim 1, wherein the polymerization of the monomer having one or more ethylenic unsaturated bonds is carried out in the inside of an extruder.

9. A polyarylene sulfide resin composition according to claim 1, wherein there is contained 10 to 300 parts by weight of a filler based on 100 parts by weight of the total weight of the polyarylene sulfide resin, thermoplastic polyester, unsaturated polyester and monomer having one or more ethylenic unsaturated bonds.

10. A polyarylene sulfide resin composition according to claim 9, wherein the filler is a glass fiber or carbon fiber.

11. A polyarylene sulfide resin composition according to claim 1, wherein the thermoplastic polyester is one member selected from the group consisting of polyethylene terephthalate, polybutylene terephthalate and polycyclohexanedimethylene terephthalate.

12. A polyarylene sulfide resin composition according to claim 1, wherein the polymerization of the monomer having one or more ethylenic unsaturated bonds is carried out, in a condition such that the polyarylene sulfide resin, thermoplastic polyester having no ethylenic unsaturated bond and unsaturated polyester are in a molten state, with the assistance of a polymerization initiator having a half life period of one minute or more at 100° C. which is added before the melting of said polyarylene sulfide resin, said thermoplastic polyester and said unsaturated polyester in an amount of 0.01 to 20 parts by weight based on 100 parts by weight of the total weight of said polyarylene sulfide resin, said thermoplastic polyester, said unsaturated polyester and said monomer.

* * * * *